United States Patent
Murray Herrera et al.

(10) Patent No.: US 10,949,985 B2
(45) Date of Patent: Mar. 16, 2021

(54) SYSTEM AND METHODS FOR PARALLEL PROCESSING MOTION ESTIMATION OF DIGITAL VIDEOS

(71) Applicant: STC.UNM, Albuquerque, NM (US)

(72) Inventors: Victor Manuel Murray Herrera, Lima (PE); Marios Stephanou Pattichis, Albuquerque, NM (US); Paul A. Rodriguez-Valderrama, Lima (PE)

(*) Notice: Subject to any disclaimer, the term of this patent is extended or adjusted under 35 U.S.C. 154(b) by 74 days.

(21) Appl. No.: 16/096,843

(22) PCT Filed: Jun. 2, 2017

(86) PCT No.: PCT/US2017/035749
§ 371 (c)(1),
(2) Date: Oct. 26, 2018

(87) PCT Pub. No.: WO2017/210601
PCT Pub. Date: Dec. 7, 2017

(65) Prior Publication Data
US 2019/0139234 A1 May 9, 2019

Related U.S. Application Data

(60) Provisional application No. 62/344,736, filed on Jun. 2, 2016.

(51) Int. Cl.
*G06T 7/269* (2017.01)
*G06T 7/20* (2017.01)
(Continued)

(52) U.S. Cl.
CPC .............. *G06T 7/269* (2017.01); *G06F 17/12* (2013.01); *G06F 17/13* (2013.01); *G06T 1/20* (2013.01);
(Continued)

(58) Field of Classification Search
None
See application file for complete search history.

(56) References Cited

U.S. PATENT DOCUMENTS 5,790,686 A 8/1998 Koc et al.
6,628,715 B1 * 9/2003 Iu .................... H04N 19/537
375/240.16
(Continued)

OTHER PUBLICATIONS

V. Murray, P. Rodriguez, and M. S. Pattichis, "2d instantaneous frequency-based method for motion estimation using total variation," in IEEE Global Conference on Signal and Information Processing, Dec. 2014.
(Continued)

*Primary Examiner* — Joshua L Schwartz
(74) *Attorney, Agent, or Firm* — Valauskas Corder LLC

(57) ABSTRACT

An AM-FM representation is used to derive AM and FM based equations that can be applied to two consecutive frames in parallel to derive motion estimates. The multidimensional AM-FM representations provide general representations of non-stationary content in digital images. The AM-FM estimate captures single images and features of a video that can lead to different applications in image and video analysis, for example, computer-aided diagnosis in medical applications or monitoring micro-movements of rocky material in the pit slopes.

14 Claims, 4 Drawing Sheets

(51) Int. Cl.
*H04N 19/436* (2014.01)
*H04N 19/00* (2014.01)
*H04N 19/43* (2014.01)
*G06F 17/12* (2006.01)
*G06F 17/13* (2006.01)
*G06T 1/20* (2006.01)

(52) U.S. Cl.
CPC .............. *G06T 7/20* (2013.01); *H04N 19/00* (2013.01); *H04N 19/43* (2014.11); *H04N 19/436* (2014.11); *G06T 2207/10016* (2013.01)

(56) References Cited

U.S. PATENT DOCUMENTS

| | | | |
|---|---|---|---|
| 8,515,201 B1* | 8/2013 | Murray Herrera | G06K 9/527 382/100 |
| 8,908,992 B1 | 12/2014 | Rodriguez-Valderrama et al. | |
| 9,389,431 B2* | 7/2016 | Wall, III | G02B 27/646 |
| 2004/0027454 A1 | 2/2004 | Vella et al. | |
| 2009/0174782 A1 | 7/2009 | Kahn et al. | |
| 2011/0234227 A1 | 9/2011 | Senften et al. | |
| 2014/0285717 A1* | 9/2014 | Cai | H04N 21/23418 348/571 |
| 2015/0358630 A1* | 12/2015 | Pierson | H04N 19/436 375/240.12 |
| 2016/0261845 A1* | 9/2016 | Xu | G06T 7/269 |

OTHER PUBLICATIONS

V. Murray, P. Rodriguez, M. Noriega, A. Dasso, and M. Pattichis, "2d amplitude-modulation frequency-modulation-based method for motion estimation," in IEEE 6th Latin American Symposium on Circuits Systems, Feb. 2015, pp. 1-4.

S. Murillo, V. Murray, C. Loizou, C. Pattichis, M. Pattichis, and E. S. Barriga, "Multi-scale am-fm motion analysis of ultrasound videos of carotid artery plaques," in SPIE Medical Imaging. International Society for Optics and Photonics, 2012, pp. 832 011-832 011.

B. K. Horn and B. G. Schunck, "Determining optical flow," in 1981 Technical Symposium East. International Society for Optics and Photonics, 1981, pp. 319-331.

B. D. Lucas, T. Kanade et al., "An iterative image registration technique with an application to stereo vision." in DARPA Image Understanding Workshop, vol. 81, 1981, pp. 674-679.

J. L. Barron, D. J. Fleet, and S. S. Beauchemin, "Performance of optical flow techniques," International journal of computer vision, vol. 12, No. 1, pp. 43-77, 1994.

A. C. Bovik, The essential guide to video processing. Academic Press, 2009.

V. M. Murray Herrera, "AM-FM methods for image and video processing," Ph.D. dissertation, University of New Mexico, 2008.

S. Baker and I. Matthews, "Lucas-kanade 20 years on: A unifying framework," International journal of computer vision, vol. 56, No. 3, pp. 221-255, 2004.

* cited by examiner

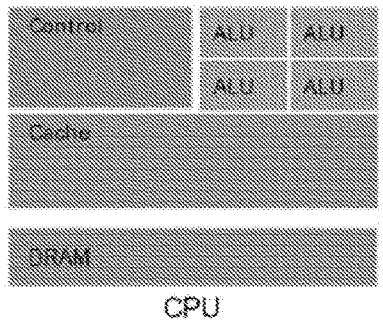 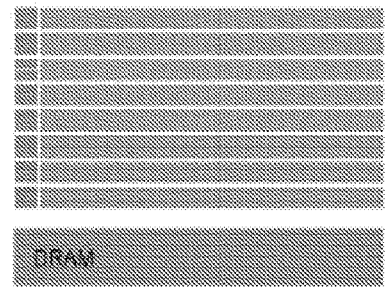
CPU  GPU
FIG. 2A  FIG. 2B
| Image size | CPU (seconds) | GPU (seconds) |
|---|---|---|
| 360x480 | 0.026 | 0.034 |
| 720x960 | 0.091 | 0.080 |
| 1080x1440 | 0.737 | 0.198 |
FIG. 3A
| Image size | CPU (seconds) | GPU (seconds) |
|---|---|---|
| 360x480 | 4.77 | 4.62 |
| 720x960 | 20.37 | 20.01 |
| 1080x1440 | 124 | 121 |
FIG. 3B
| Image size | CPU (seconds) | GPU (seconds) |
|---|---|---|
| 512x512 | 3.15 | 1.43 |
| 768x768 | 9.82 | 5.36 |
| 1024x1024 | 20.3 | 11.4 |
FIG. 3C
| Image size | CPU (seconds) | GPU (seconds) |
|---|---|---|
| 512x512 | 38.4 | 23.3 |
| 768x768 | 83.8 | 51.3 |
| 1024x1024 | 139 | 94.7 |
FIG. 3D

SYSTEM AND METHODS FOR PARALLEL PROCESSING MOTION ESTIMATION OF DIGITAL VIDEOS

CROSS-REFERENCE TO RELATED APPLICATIONS

This application claims priority to U.S. Provisional Patent Application Ser. No. 62/344,736 filed Jun. 2, 2016, incorporated by reference.

FIELD OF THE INVENTION

The invention relates generally to processing of digital video content. More specifically, the invention relates to motion estimation from digital videos based on the estimation of amplitude-modulated frequency-modulated (AM-FM) components of each frame.

BACKGROUND OF THE INVENTION

Motion estimation methods in digital videos are increasingly used in various applications such as security, medicine, or tracking. Obtaining information movement is the first step for advanced applications where artificial intelligence methods could make quick decisions with less error compared to humans. The Horn-Schunck (HS) method provides the basis of a variational framework for motion estimation. The increasing power of computation units facilitated the development of increasingly accurate models. Unfortunately, there are two major limitations with currently available technologies: 1) the accuracy of the estimate and 2) the processing time. There is a present market need for new methods that produce more accurate motion estimations from noisy videos in rapid time.

The invention provides a new approach for motion estimation in digital videos based on the estimation of amplitude-modulated frequency-modulated (AM-FM) components of each frame.

SUMMARY OF THE INVENTION

The invention provides a method for motion estimation from digital videos based on the use of 2D amplitude-modulation frequency-modulation (AM-FM) models motivated by the need to describe complex movements and textures that cannot be modeled effectively by the standard optical flow methods based on intensity. Incorporated by reference are U.S. Pat. No. 8,515,201 issued Aug. 20, 2013, and U.S. Pat. No. 8,908,992 issued Dec. 9, 2014, both directed to image and video processing based on AM-FM demodulation used to calculate estimates for instantaneous amplitude (IA), instantaneous phase (IP), and instantaneous frequency (IF).

Compared to intensity-based approaches, the invention yields significantly better estimates for translational texture motions. Furthermore, the method may be used for images with textures without well-defined edges. The method according to the invention may successfully estimate motion of both sinusoidal, periodic motions, and constant, translational motions, of synthetic AM-FM textures, and motions in textured video images more generally.

An AM-FM representation is used to derive AM and FM based equations that can be applied to two consecutive frames to derive motion estimates. The multidimensional AM-FM representations provide representations of non-continuous information images. The AM-FM estimate captures single images and features of a video that can lead to different applications in image and video analysis, including computer-aided diagnosis in medical applications. For example, the invention may be used with ultrasound equipment to produce new and improved information to the user analyzing the imagery.

According to the invention, the method for motion estimation implements a new AM-FM representation that is based on two consecutive frames only. In certain embodiments, the invention can combine estimates from different scales to provide better estimates of more complex motions.

The joint use of the instantaneous amplitude (IA) and estimates of instantaneous frequency (IF) are considered to estimate the movements of two video images. The invention also presents a theoretical framework that extends prior work based on the Horn-Schunck and Lucas-Kanade methods. Some potential applications of these methods in mining involve monitoring distributed smart cameras and computer vision to monitor the work front for geo-mechanics characterization in situ, monitoring and remote control of equipment such as drilling jumbos or paddles so which they can be operated by autonomous robotic equipment in the future, monitoring mine ventilation parameters, danger zones, etc., which allow monitoring and control mine safety of the excavation, or mined in an open pit where is necessary to monitor micro-movements of rocky material in the pit slopes.

The invention provides accurate and rapid methods for motion estimation that can be used in various mining applications, such as in the analysis of individual movement of each particle in the chemical process the minerals. In such applications, motion estimation can be based on a combination of fast GPU implementations of Horn-Schunck, Lucas-Kanade, and amplitude-modulated frequency-modulated (AM-FM) methods.

The invention provides for the parallel implementation of advanced methods of motion estimation in digital videos. According to the invention, the methods may be part of the state-of-the-art methods found in free and commercial software or use parts of these programs in combination with amplitude-modulated frequency-modulated (AM-FM) methods. This method can also provide more accurate motion estimates in medical applications. According to the invention processing times are reduced by up to three times using GPUs. As an example directed to the field of mining, there are various applications that require these methods but require complex equipment or high resolution cameras due to the limitations of current methods. However, the invention may obtain accurate and fast results in different applications.

BRIEF DESCRIPTION OF THE DRAWINGS

FIG. 2A illustrates a block diagram of a CPU architecture.

FIG. 2B illustrates a block diagram of a GPU architecture.

FIG. 3A illustrates a table directed to runtime of the Horn-Schunck function executed in a CPU and a GPU.

FIG. 3B illustrates a table directed to runtime of the Lucas-Kanade function executed in a CPU and a GPU.

FIG. 3C illustrates a table directed to runtime of the AM-FM function executed in a CPU and a GPU using a single frequency scale.

FIG. 3D illustrates a table directed to runtime of the AM-FM function executed in a CPU and a GPU using a 5-scale filterbank.

DETAILED DESCRIPTION OF THE INVENTION

Figure 1:
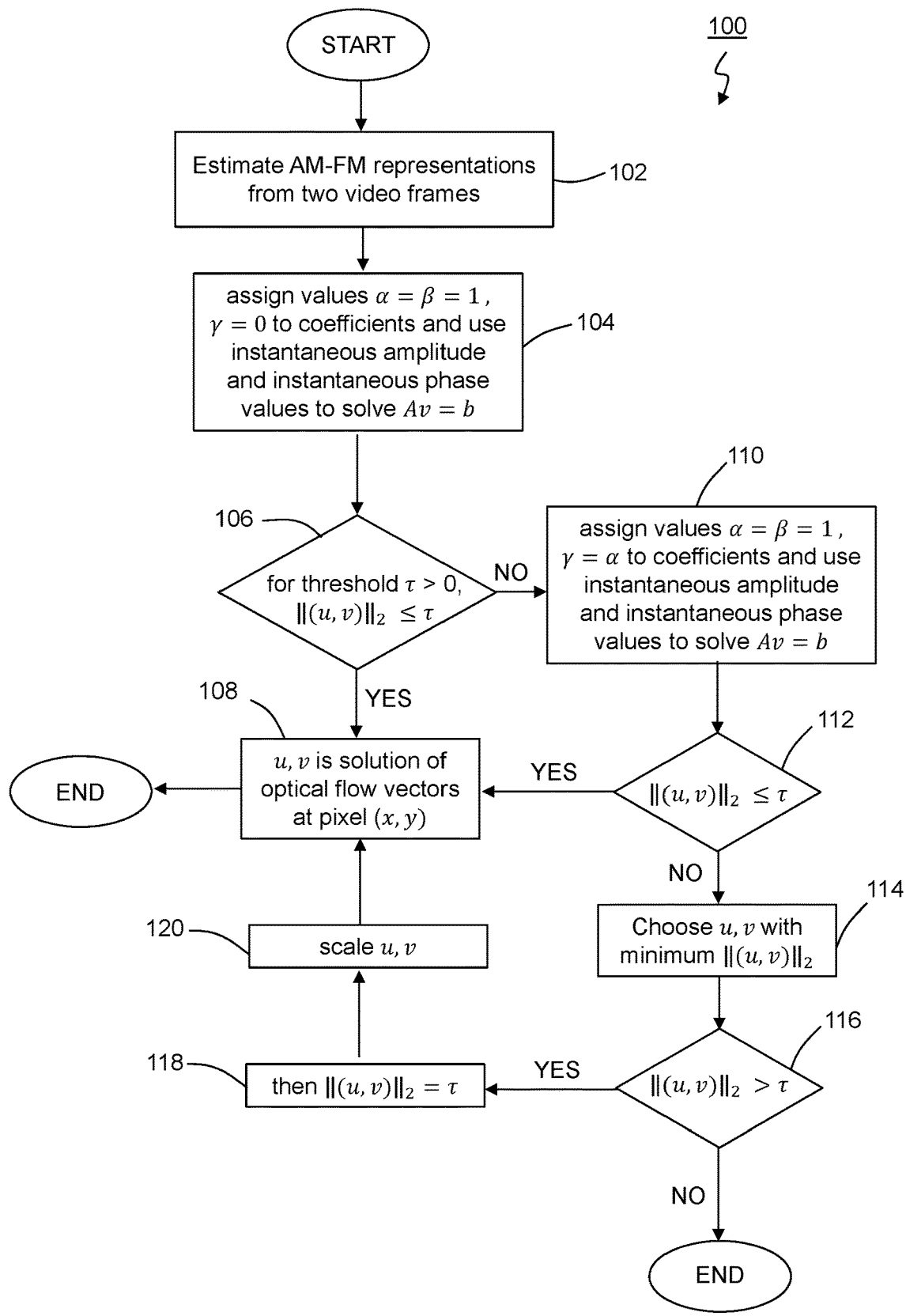
FIG. 1 is a flow chart of the method for solving optical flow restriction according to the invention assuming that an AM-FM demodulation approach has been used to estimate the AM-FM components for two video frames.

The optical flow represents the apparent rate of motion of objects using brightness patterns of consecutive images. This optical flow is found by analyzing the pattern of brightness of objects of consecutive images assuming that lighting is uniform on the surfaces of objects. However, the lighting is not constant in real cases.

Although there are several methods to estimate the optical flow of an object, for exemplary purposes the invention is discussed with respect to the Horn-Schunck, Lucas-Kanade and AM-FM methods.

The Horn-Schunck (HS) method takes two constraints for the components of the motion. The first is that the brightness of objects in the video, denoted by E(x,y,t), is constant. The other assumption is that image intensity varies slowly. Based on these assumptions:

$$E_x u + E_y v + E_t = 0, \tag{1}$$

$$\nabla^2 u = \left(\frac{\partial u}{\partial x}\right)^2 + \left(\frac{\partial u}{\partial y}\right)^2 \text{ and } \nabla^2 v = \left(\frac{\partial v}{\partial x}\right)^2 + \left(\frac{\partial v}{\partial y}\right)^2, \tag{2}$$

where $E_x$, $E_y$, and $E_t$ are the partial derivatives with respect to (x,y) and time. The velocity components in the x,y coordinates are denoted with u and v respectively.

The HS algorithm has three processes to follow in order to obtain the desired result. The first process is to estimate the partial derivatives of image brightness by:

$$E_x \approx \tfrac{1}{4}\{E_{i,j+1,k} - E_{i,j,k} + E_{i+1,j+1,k} - E_{i+1,j,k} + E_{i,j+1,k+1} - E_{i,j,k+1} + E_{i+1,j+1,k+1} - E_{i+1,j,k+1}\} \tag{3}$$

$$E_y \approx \tfrac{1}{4}\{E_{i+1,j,k} - E_{i,j,k} + E_{i+1,j+1,k} - E_{i,j+1,k} + E_{i+1,j,k+1} - E_{i,j,k+1} + E_{i+1,j+1,k+1} - E_{i,j+1,k+1}\} \tag{4}$$

$$E_t \approx \tfrac{1}{4}\{E_{i,j,k+1} - E_{i,j,k} + E_{i+1,j,k+1} - E_{i+1,j,k} + E_{i,j+1,k+1} - E_{i,j+1,k} + E_{i+1,j+1,k+1} - E_{i+1,j+1,k}\} \tag{5}$$

Then the values of (u,v) can be obtained by:

$$\bar{u}_{i,j,k} = \tfrac{1}{6}\{u_{i-1,j,k} + u_{i,j+1,k} + u_{i+1,j,k} + u_{i,j-1,k}\} + \tfrac{1}{12}\{u_{i-1,j-1,k} + u_{i-1,j+1,k} + u_{i+1,j-1,k} + u_{i+1,j+1,k}\}\ \ (6)$$

$$\bar{v}_{i,j,k} = \tfrac{1}{6}\{v_{i-1,j,k} + v_{i,j+1,k} + v_{i+1,j,k} + v_{i,j-1,k}\} + \tfrac{1}{12}\{v_{i-1,j-1,k} + v_{i-1,j+1,k} + v_{i+1,j-1,k} + v_{i+1,j+1,k}\}\ \ (7)$$

The Lucas-Kanade (LK) method divides the image into regions of small boxes and assumes that the displacement of each frame between two instants is almost constant. This conjecture is represented by:

$$I_x + I_y = I_t \tag{8}$$

where $I_x$, $I_y$, $I_t$ represent the partial derivatives with respect to position (x,y) and time (t). The optical flow motions are represented by u and v. The solution is found by:

$$\begin{bmatrix} u \\ v \end{bmatrix} = \begin{bmatrix} \sum W^2 I_x^2 & \sum W^2 I_x I_y \\ \sum W^2 I_y I_x & \sum W^2 I_y^2 \end{bmatrix}^{-1} \begin{bmatrix} -\sum W^2 I_x I_t \\ -\sum W^2 I_y I_t \end{bmatrix} \tag{9}$$

All N-dimensional signals can be represented by its amplitude-modulated frequency-modulated (AM-FM) components. First, the representation of multicomponent AM-FM digital video I(x,y,t) is given by:

$$I_{(x,y,t)} = \sum_{n=1}^{M} a_n(x, y, t)\cos(\varphi_n(x, y, t)), \tag{10}$$

where n=1, 2, ..., M indexes the AM-FM components, $a_n(x,y,t)\cos(\varphi_n(x,y,t))$ represents the n-th AM-FM component, $a_n$ symbolizes the n-th instantaneous amplitude (IA) component, and $\varphi_n$ represents the n-th instantaneous phase (IP) component. Then, the instantaneous frequency (IF) is defined in terms of the gradient of the instantaneous phase $\nabla \varphi_n(x,y,t)$.

A motion estimation method using AM-FM in 3D considering a single component AM-FM is given by I(x,y,t)=a(x,y,t)exp(jφ(x,y,t)) with the basic idea to apply the optical flow restriction given by:

$$\langle \nabla I(x, y), (u, v) \rangle + \frac{\partial}{\partial t} I = 0, \tag{11}$$

where $\langle . \rangle$ represents inner product. Then the AM restriction resulting from the imposition of the Optic Flow Constraint Equation (OFCE) restriction on the real part is given by:

$$\langle \nabla a(x, y), (u, v) \rangle + \frac{\partial}{\partial t} a = 0 \tag{12}$$

Similarly, the FM restricting the imposition of restrictions on the imaginary part is given by:

$$\langle \nabla \varphi(x, y), (u, v) \rangle + \frac{\partial}{\partial t} \varphi = 0 \tag{13}$$

An advantage of this approach is that it provides two equations—Equations (12) and (13)—per pixel per AM-FM component. Motion estimation of the u(x,y) and v(x,y) vectors are calculated using an iterative method based on finite difference approximations.

Based on the AM-FM representation for motion estimation between two consecutive images and after testing solutions based on methods of total variation, a linear system of equations given by:

$$Av = b, \tag{14}$$

-continued where $$A = \begin{bmatrix} \alpha \sum W^2 \varphi_x^2 & \alpha \sum W^2 \varphi_x \varphi_y \\ \alpha \sum W^2 \varphi_y \varphi_x & \alpha \sum W^2 \varphi_y^2 \\ \beta \sum W^2 a_x^2 & \beta \sum W^2 a_x a_y \\ \beta \sum W^2 a_y a_x & \beta \sum W^2 a_y^2 \\ \gamma \sum W^2 I_x^2 & \gamma \sum W^2 I_x I_y \\ \gamma \sum W^2 I_y I_x & \gamma \sum W^2 I_y^2 \end{bmatrix} \quad (15)$$

$$v = \begin{bmatrix} u \\ v \end{bmatrix} \quad (16)$$

$$b = \begin{bmatrix} -\alpha \sum W^2 \varphi_x \varphi_t \\ -\alpha \sum W^2 \varphi_y \varphi_t \\ -\beta \sum W^2 a_x a_t \\ -\beta \sum W^2 a_y a_t \\ -\gamma \sum W^2 I_x I_t \\ \gamma \sum W^2 I_y I_t \end{bmatrix} \quad (17)$$

According to Equations (15), (16), 17), $a_x$ is the IA derivative with respect to x. Similarly, $a_y$ is the IA derivative with respect to y, and $a_t$ is the IA derivative with respect to time t. $I_x$ is the IF derivative with respect to x. Similarly, $I_y$ is the IF derivative with respect to y, and $I_t$ is the IF derivative with respect to time t. $\varphi_x$ is the IP derivative with respect to x. Similarly, $\varphi_y$ is the IP derivative with respect to y, and $\varphi_t$ is the IP derivative with respect to time t.

FIG. 1 is a flow chart of the method 100 for solving optical flow restriction according to the invention. As shown by step 102, the approach assumes estimates of the AM-FM representations for two video frames. The instantaneous amplitude (IA) and instantaneous frequency (IF) components can be estimated by any image demodulation algorithm designed to extract AM-FM components from digital video. One method for estimating AM-FM components may be that as described in U.S. Pat. No. 8,515,201 issued Aug. 20, 2013, incorporated by reference.

Parameters α, β and γ are coefficients to be determined. Based on the AM-FM component estimates, at step 104, values are assigned as α=β=1 and γ=0 to solve Equation (14). At step 106, for a threshold τ>0, if ‖(u,v)‖$_2$≤τ then (u,v) becomes the accepted solution for a particular pixel as shown by step 108. For all other pixels, if ‖(u,v)‖$_2$>τ then values are assigned as γ=β=1 and γ=α at step 110 to solve Equation (14). If ‖(u,v)‖$_2$≤τ, then (u,v) is the solution as shown by step 108. If ‖(u,v)‖$_2$>τ then at step 114 the solution is chosen with the minimum ‖(u,v)‖$_2$. If this solution meets ‖(u,v)‖$_2$>τ then at step 118 ‖(u,v)‖$_2$=τ and (u,v) scaled at step 120 to arrive at the solution at step 108.

Data and task communication between two parts of a computer is done in series or parallel. The first type of communication is implemented when the amount of operations is low and complex. The second type is used for a large number of operations at the same time, but should be of little complexity. The central processing unit (CPU) is effective when processing serial code and the graphics processing unit (GPU) is efficient to execute commands in parallel. However, there is no code to run purely serial or parallel command is always a co-processing.

FIG. 2A illustrates a block diagram of a CPU architecture and FIG. 2B illustrates a block diagram of a GPU architecture. The differences between the CPU and GPU can be seen with the CPU having more cache, control and fewer cores than the GPU, since it is used to run algorithms of great complexity. However, the GPU is more efficient for processing algorithms that can process data in parallel, since the GPU has more cores the CPU.

The programming language C++ is used for implementing each algorithm component of the serial code and the CUDA parallel computing platform for the other elements, although any programming language is contemplated. The data on the GPU is processed. First, algorithm functions are created working with loops in C++ CUDA language. After implementing the functions, the code that initiates the processes in the CPU is defined and copied to the GPU. This code runs a series of commands. First, the CPU allocates storage space on the GPU. Then, the CPU copies the data to be transferred to the GPU. Then, the CPU executes GPU cores to process data defined functions. Finally, the result of the function to which they were subjected data is copied to the CPU.

The following results were obtained using a HP laptop (Intel core i7 2.2 GHz, 16DDR3, NVIDIA GeForce video GT750n). The programming language C++, the library OpenCV and CUDA libraries are used according to one implementation of the invention, as described.

The method for solving optical flow restriction has been successfully applied to sinusoidal, periodic motions, and also on constant, translational motions, of synthetic AM-FM textures.

As shown in FIG. 3A, the table presents the runtime for motion estimation using the Horn-Schunck method in CPU versus GPU. The comparison in terms of processing time for the Lucas-Kanade method is shown in the table of FIG. 3B. The comparison of processing time for demodulating AM-FM using a single frequency scale is presented in the table of FIG. 3C. FIG. 3D illustrates a table showing the comparison in the processing time for the AM-FM estimation using five frequency scales.

Figure 4A:
FIG. 4A illustrates a graph of runtime versions of the AM-FM method implemented in the CPU and the GPU to process images of 300×300 pixels using a 1-scale filterbank according to the invention.

FIG. 4A illustrates a graph of runtime versions of the AM-FM method implemented in the CPU and the GPU to process images of 300×300 pixels using a 1-scale filterbank according to the invention. These processing times have been found after processing images of 300×300 pixels 10 times.

Figure 4B:
FIG. 4B illustrates a graph of runtime versions of the AM-FM method implemented in the CPU and the GPU to process images of 512×512 pixels using a 1-scale filterbank according to the invention.

FIG. 4B illustrates a graph of runtime versions of the AM-FM method implemented in the CPU and the GPU to process images of 512×512 pixels using a 1-scale filterbank according to the invention.

The results of runtime for the Horn-Schunck method, shown in FIG. 3A, are lower when the GPU is used in cases of images with dimensions 720×960 and 1080×1440 pixels. However, the results of the 360×480 image show an increase runtime to implement the function in the GPU. The increasing of this time occurs because the time required to transfer data to GPU is greater CPU processing time thereof.

In the case of the Lucas-Kanade method, shown in FIG. 3B, executed in the images of size 360×480, 720×960 and 1080×1440, show that the runtime decreases as the algorithm is implemented on the GPU. In addition, the GPU version is more effective to increase the amount of data to be processed.

In the case of the AM-FM method, shown in FIG. 3C and FIG. 3D, the version on the GPU is faster. However by increasing the size of the images, the runtime is further improved due to the effective implementation of the distribution of processing between all blocks of the GPU.

This implementation is the basis of the method as described in FIG. 1, where it is shown that the accuracy of this method surpasses all the state-of-the-art methods found in both open source and commercial functions. A direct application proposed to use this implementation is in the field of mining, particularly open pit mining, where monitoring of micro-movements of rocky material pit slopes is necessary. Equipment providing such services is currently available commercially, but the cost is high due to the need for complex computer equipment or high-resolution cameras. It is contemplated that other applications may include those with high sensitivity/specificity such as medical applications, or those including video with high noise components.

Figure 5:
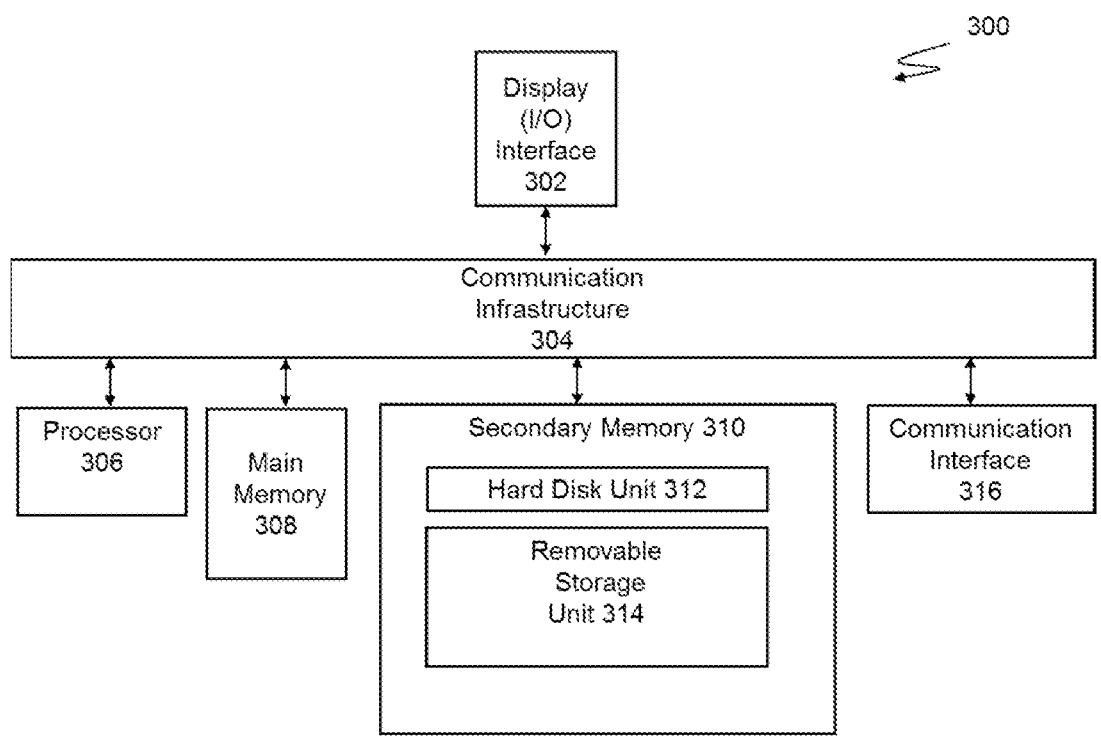
FIG. 5 illustrates an exemplary computer system 300 that may be used to implement the methods according to the invention.

FIG. 5 illustrates an exemplary computer system 300 that may be used to implement the methods according to the invention. One or more computer systems 300 may carry out the methods presented herein as computer code. In certain embodiments, the computer system 300 is configured to define the settings of the camera source component, one or more elements of the image management component, and/or the output component.

Computer system 300 includes an input/output interface 302 connected to communication infrastructure 304—such as a bus—, which forwards data such as graphics, text, and information, from the communication infrastructure 304 or from a frame buffer (not shown) to other components of the computer system 300. The input/output interface 302 may be, for example, a keyboard, touch screen, joystick, wand, video game controller, trackball, mouse, monitor, speaker, printer, Google Glass® unit, web camera, any other computer peripheral device, or any combination thereof, capable of entering and/or viewing data.

Computer system 300 includes one or more processors 306, which may be a special purpose or a general-purpose digital signal processor that processes certain information. Computer system 300 also includes a main memory 308, for example random access memory (RAM), read-only memory (ROM), mass storage device, or any combination thereof. Computer system 300 may also include a secondary memory 310 such as a hard disk unit 312, a removable storage unit 314, or any combination thereof. Computer system 300 may also include a communication interface 316, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 308, secondary memory 310, communication interface 316, or a combination thereof, function as a computer usable storage medium, otherwise referred to as a computer readable storage medium, to store and/or access computer software including computer instructions. Certain embodiments of a computer readable storage medium do not include any transitory signals or waves. For example, computer programs or other instructions may be loaded into the computer system 300 such as through a removable storage device, for example, a floppy disk, ZIP disks, magnetic tape, portable flash drive, optical disk such as a CD or DVD or Blu-ray. Specifically, computer software including computer instructions may be transferred from the removable storage unit 314 or hard disc unit 312 to the secondary memory 310 or through the communication infrastructure 304 to the main memory 308 of the computer system 300.

Communication interface 316 allows software, instructions, and data to be transferred between the computer system 300 and external devices or external networks. Software, instructions, and/or data transferred by the communication interface 316 are typically in the form of signals that may be electronic, electromagnetic, optical, or other signals capable of being sent and received by the communication interface 316. Signals may be sent and received using wire or cable, fiber optics, a phone line, a cellular phone link, a Radio Frequency (RF) link, wireless link, or other communication channels.

Computer programs, when executed, enable the computer system 300, particularly the processor 306, to implement the methods of the invention according to computer software including instructions.

The computer system 300 described herein may perform any one of, or any combination of, the steps of any of the methods presented herein. It is also contemplated that the methods according to the invention may be performed automatically, or may be invoked by some form of manual intervention.

The computer system 300 of FIG. 7 is provided only for purposes of illustration, such that the invention is not limited to this specific embodiment. It is appreciated that a person skilled in the relevant art knows how to program and implement the invention using any computer system.

The computer system 300 may be a handheld device and include any small-sized computer device including, for example, a personal digital assistant (PDA), smart hand-held computing device, cellular telephone, or a laptop or netbook computer, hand held console or MP3 player, tablet, or similar hand held computer device, such as an iPad®, iPad Touch® or iPhone®.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A method for estimating motion of a digital video using a combination of instantaneous amplitude (IA) components from two video frames, instantaneous frequency (IF) components from two video frames, or instantaneous amplitude (IA) components and instantaneous frequency (IF) components from two video frames, wherein the digital video I(x,y,t) is represented by:

$$I(x,y,t) = \sum_{n=1}^{M} a_n(x,y,t)\cos(\varphi_n(x,y,t)),$$

where n=1, 2, ..., M indexes the AM-FM components,
$a_n(x,y,t)\cos(\varphi_n(x,y,t))$ represents the n-th AM-FM component,
$a_n$ symbolizes the n-th instantaneous amplitude (IA) component,
$\varphi_n$ represents the n-th instantaneous phase (IP) component, and
the instantaneous frequency (IF) is defined in terms of a gradient of the instantaneous phase (IP) component $\nabla\varphi_n(x,y,t)$.

2. The method according to claim 1 wherein the two video frames are consecutive video frames.

3. The method according to claim 1 wherein a system of linear equations is used for estimating motions from one or more instantaneous frequency (IF) components only.

4. The method according to claim 1 wherein a system of linear equations is used for estimating motions from one or more gradients and time-derivatives of the instantaneous amplitude (IA) components only.

5. The method according to claim 1 wherein a system of linear equations is used for estimating motions using linear combinations of one or more derivatives of the instantaneous amplitude (IA) components and one or more instantaneous frequency (IF) components.

6. The method according to claim 1 wherein the motion is estimated using a GPU.

7. The method according to claim 1 wherein the instantaneous amplitude (IA) components and the instantaneous frequency (IF) components are computed in parallel.

8. The method according to claim 1 wherein the instantaneous amplitude (IA) components and the instantaneous frequency (IF) components are estimated by any image demodulation algorithm that is designed to extract AM-FM components from digital video.

9. The method according to claim 1 wherein the motion estimated is a constant, translation motion.

10. The method according to claim 1 wherein the motion estimated is a sinusoidal, periodic motion.

11. The method according to claim 1 wherein the motion estimated is a quadratic motion.

12. The method according to claim 1 wherein the combination of the instantaneous amplitude (IA) components and the instantaneous frequency (IF) components come from different filterbanks.

13. The method according to claim 1 further comprising instantaneous phase (IP) components from two video frames.

14. The method according to claim 13 wherein a system of linear equations is used for estimating motions using linear combinations of one or more derivatives of the instantaneous amplitude (IA) components, one or more instantaneous frequency (IF) components, and one or more time derivatives of instantaneous phase (IP).

* * * * *